US 6,729,516 B2

(12) United States Patent
Hanagan (10) Patent No.: US 6,729,516 B2
(45) Date of Patent: May 4, 2004

(54) QUICK CHANGE STORAGE COMPARTMENT FOR MOTORCYCLE (75) Inventor: Michael W. Hanagan, Monterey, CA (US)

(73) Assignee: Corbin Pacific, Inc., Hollister, CA (US)

( * ) Notice: Subject to any disclaimer, the term of this patent is extended or adjusted under 35 U.S.C. 154(b) by 27 days.

(21) Appl. No.: 09/797,449

(22) Filed: Mar. 1, 2001

(65) Prior Publication Data

US 2002/0121534 A1 Sep. 5, 2002

(51) Int. Cl.⁷ .................................................. B62J 7/00
(52) U.S. Cl. ........................ 224/423; 224/419; 224/427; 224/428; 224/430; 224/431; 224/433
(58) Field of Search ................. 224/423, 419, 224/427, 428, 430, 431, 433, 447, 448; 280/202, 495; 180/219, 220, 89.1; 296/37.1

(56) References Cited

U.S. PATENT DOCUMENTS

| 3,301,448 | A | * | 1/1967 | Inoue .......................... 180/210 |
| 3,625,405 | A | | 12/1971 | Kezar et al. |
| 3,850,353 | A | * | 11/1974 | Foulds ........................ 180/210 |
| 4,050,615 | A | * | 9/1977 | Kline .......................... 224/401 |
| 4,266,703 | A | | 5/1981 | Litz |
| 4,325,562 | A | | 4/1982 | Yamada et al. |
| 4,440,330 | A | | 4/1984 | Goodman |
| 4,485,884 | A | | 12/1984 | Fukunaga et al. |
| 4,974,765 | A | * | 12/1990 | Marchetto et al. .......... 224/275 |
| 5,107,949 | A | | 4/1992 | Gotoh et al. |
| 5,356,058 | A | | 10/1994 | Fenton |
| 6,332,639 | B1 | * | 12/2001 | Tanaka et al. .............. 182/116 |
| 6,354,476 | B1 | * | 3/2002 | Alderman .................... 224/413 |
| 6,378,643 | B1 | * | 4/2002 | Galbraith et al. ........... 180/219 |

* cited by examiner

Primary Examiner—Gregory Vidovich
Assistant Examiner—Maerena W. Brevard (57) ABSTRACT A readily removable storage unit for mounting on the rear fender of a motorcycle comprising a storage compartment member defining an open cavity and a cover pivotably mounted on the compartment member adjacent its front end for movement between a cavity closing position and an open position. A lock is provided on the compartment member and the cover adjacent the rear wall for securing the cover in the cavity closing position. A fastener on the bottom wall of the compartment member is engageable with the rear fender of the motorcycle, and the saddle and compartment member have a cooperating releasable tongue and bracket so that the storage unit is mounted by first engaging the saddle and then engaging the fastener in the motorcycle rear fender.

15 Claims, 8 Drawing Sheets

QUICK CHANGE STORAGE COMPARTMENT FOR MOTORCYCLE

BACKGROUND OF THE INVENTION

The present invention relates to motorcycle accessories and, more particularly, to storage compartments for use on motorcycles.

Owners of motorcycles generally desire a sleek looking appearance, particularly when they are riding solo. Some owners desire the versatility of being able to add and remove a rear seat quickly when they wish to be accompanied by a passenger. Some frequently desire a storage unit which can be mounted upon the motorcycle readily in order to enable them to carry clothing, tools and whatever else they might require. As a result, various structures have been developed which can be mounted either on the frame or on the rear fender, many of which require a number of fasteners in order to achieve the desired mounting, and disengagement of those fasteners in order to remove the structure.

It is an object of the present invention to provide a novel storage compartment for rapid mounting on, and dismounting from, a motorcycle.

It is also an object to provide such a storage compartment which is streamlined and attractive in appearance.

Another object is to provide such a storage compartment which can be rapidly interchanged with a rear seat utilizing essentially the same mounting means.

A further object is to provide such a storage compartment which may be fabricated readily from synthetic resin to provide a relatively low cost but attractive structure which will enjoy a long life.

SUMMARY OF THE INVENTION

It has now been found that the foregoing and related objects may be readily attained in a readily removable storage unit for mounting on the rear fender of a motorcycle with a saddle. The storage unit comprises a storage compartment member having front, rear, side, and bottom walls defining a cavity therebetween. Pivotably mounted on the compartment member adjacent the front wall is a cover dimensioned and configured to provide a closure for the cavity, and is movable between a cavity closing position and an open position.

For securing the cover in the cavity closing position, cooperating releasable locking means are provided on the cover and on the compartment member adjacent the rear wall. Also included are releasable mounting means on the bottom wall of the compartment member for engagement with the rear fender of the motorcycle upon which the storage unit is mounted, and releasable engagement means on the compartment member adjacent the front wall engageable with cooperating engagement means on the saddle of the motorcycle. The storage unit is mounted by engaging the engagement means on the compartment member with the saddle and then engaging the mounting means with the motorcycle rear fender.

Usually, the bottom wall of the storage compartment member is elongated and arcuate along its elongated axis to conform to the configuration of the motorcycle fender. Desirably, the bottom wall is also arcuate in the transverse direction to conform to the configuration of the motorcycle fender, and the bottom wall also has resilient bumpers thereon to space the bottom wall from the motorcycle fender. A threaded fastener is seated in an aperture in the bottom wall for engagement in a threaded aperture in the rear fender to provide the releasable mounting means.

Preferably, the cover has a recess in which an element of the locking means is seated, and extending about the periphery of the cover is sealing means which extends into a cooperating recess in the compartment member. A pull strap is provided adjacent the locking means on the cover to facilitate pivoting of the cover into the open position. Most desirably the cover is arcuate in the longitudinal direction and the side walls taper from the front wall to a reduced dimension at the rear wall to provide a streamlined appearance.

In one embodiment, the engagement means comprises a tongue on the bottom wall extending beyond the front wall to engage the saddle. In another embodiment, the engagement means comprises a bracket on the bottom wall which is adapted to receive a tongue projecting rearwardly from the saddle.

DETAILED DESCRIPTION OF THE PREFERRED EMBODIMENT

Figure 1:
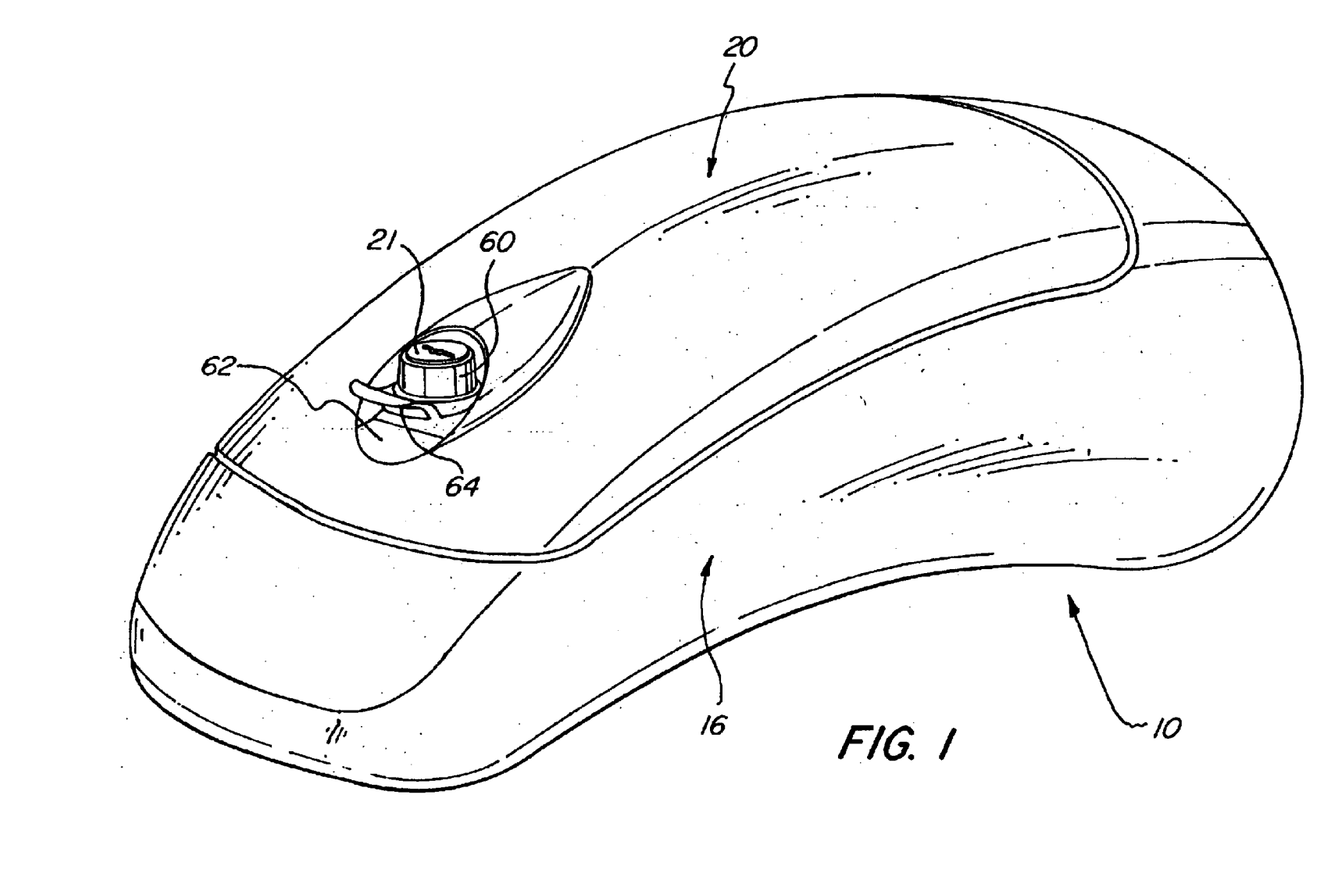
FIG. 1 is a perspective view of a storage compartment embodying the present invention.

Turning first to FIG. 1 of the attached drawings, therein illustrated is a quick change storage compartment unit adapted to be mounted on the rear fender of a motorcycle and generally designated by the numeral 10. The unit 10 is comprised of a storage container generally designated by the numeral 16 and a cover generally designated by the numeral 20 which is locked in a closed position by the lock assembly generally designated by the numeral 21.

Figure 2:
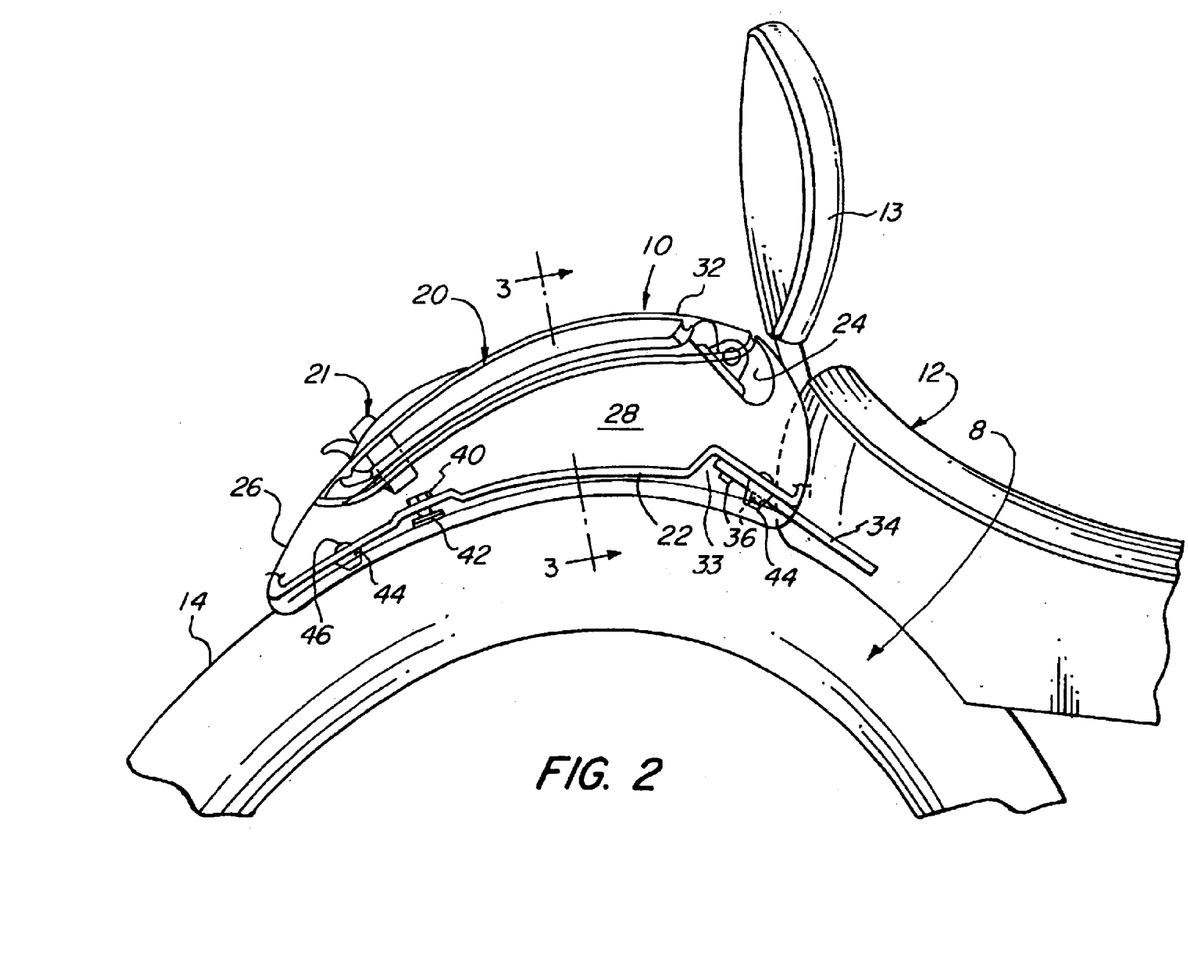
FIG. 2 is a longitudinal section thereof as mounted upon the rear fender of a motorcycle which is fragmentarily illustrated.

As seen in FIG. 2, the compartment 10 is mounted on the rear fender 14 of a motorcycle 8 behind the saddle generally designated by the numeral 12. In this particular embodiment, the motorcycle saddle also has a backrest 13.

Figure 4:
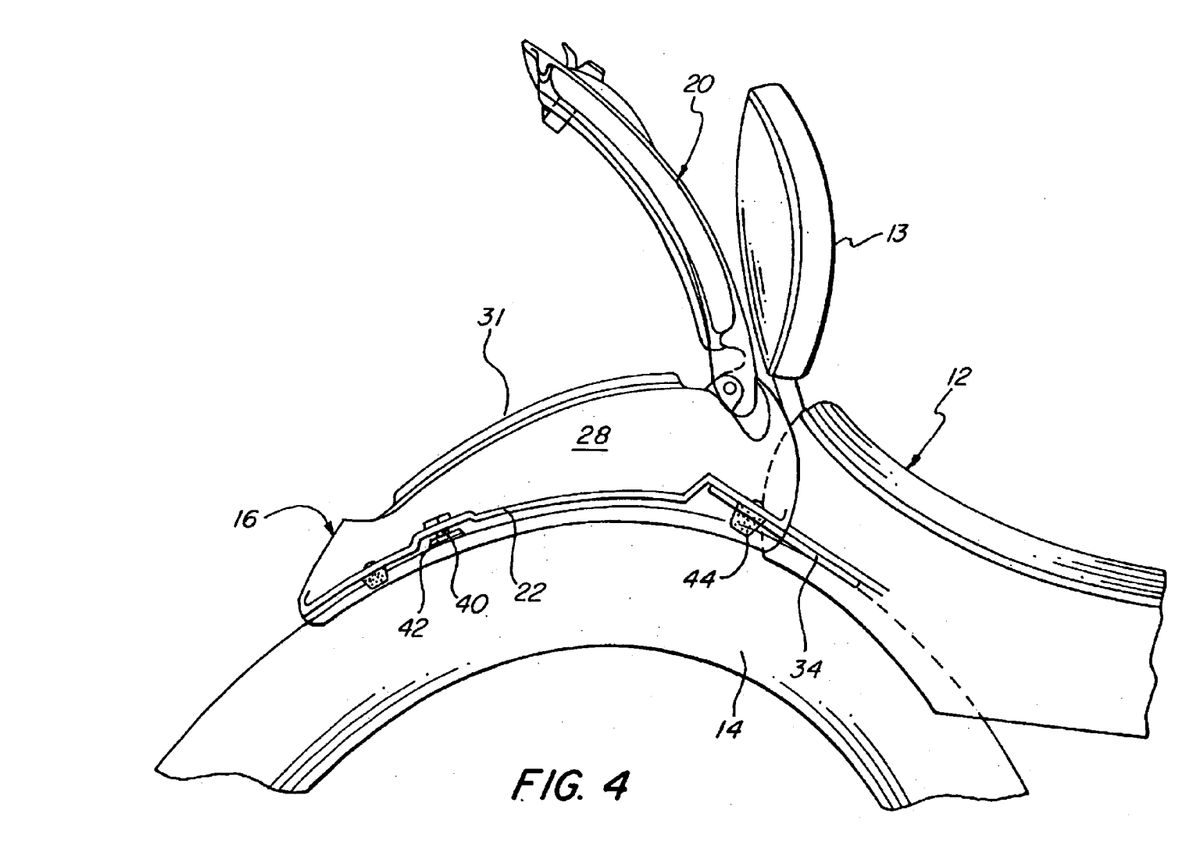
FIG. 4 is a view similar to FIG. 2 with the cover in the open position.

Turning now in detail to the storage container 16, it has a bottom wall 22, a front wall 24, a rear wall 26, side walls 28 and a top wall 32 providing an opening 31 over which the cover 20 extends. As seen in FIGS. 2 and 4, the bottom wall 22 has a recess 33 adjacent the front wall 24 in which is seated the rearward end of an elongated tongue 34 secured to the bottom wall 22 by fasteners 36.

Figure 3:
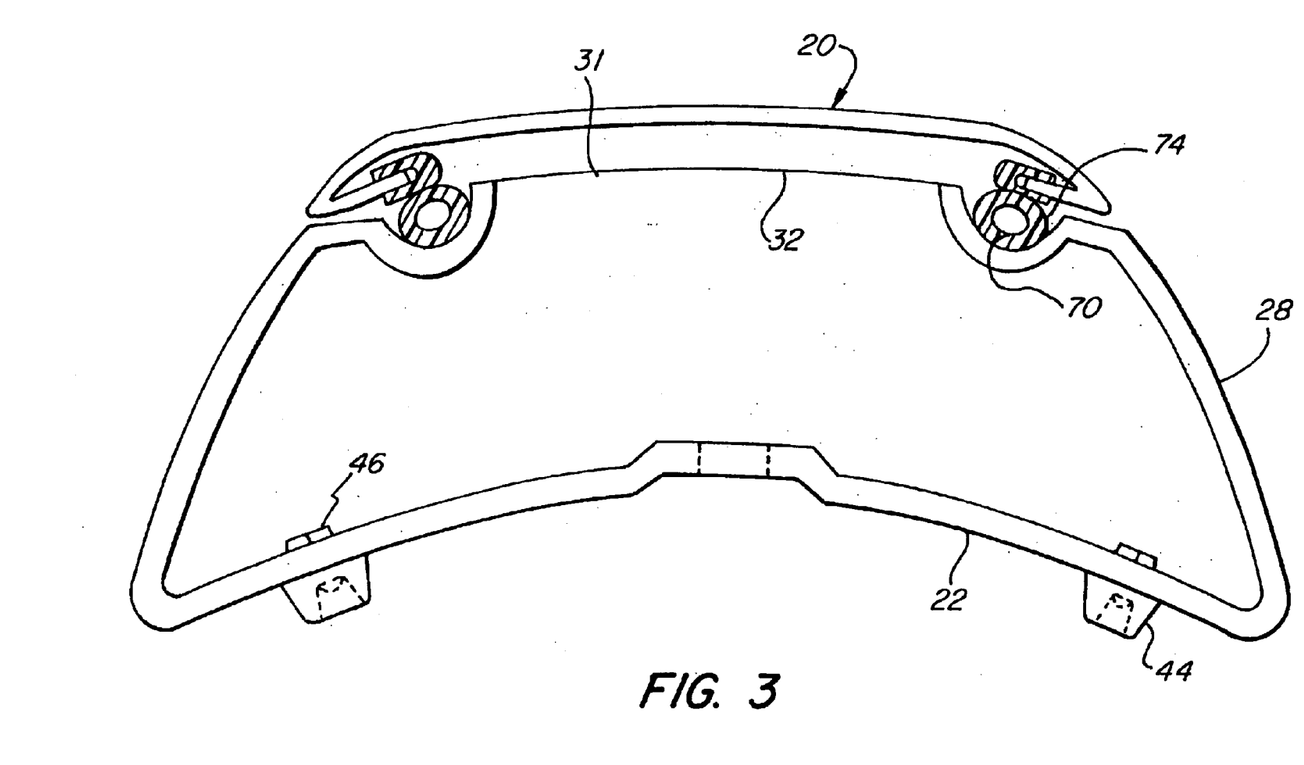
FIG. 3 is a cross sectional view of the assembly of FIG. 2 along the lines 3—3 of FIG. 2.

As seen in FIGS. 2–4, tongue 34 extends into a recess opening on the rear surface of the saddle 12 so as to engage the front end of the compartment unit 10. Also provided in the bottom wall 22 somewhat forwardly of the rearward end of the opening 31 is an aperture (not shown) in which is seated a threaded fastener 40. As shown in FIGS. 2 and 4, the threaded fastener 40 is engageable in a threaded insert 42 in the rear fender 14 to secure the compartment unit 10 in firm engagement with the rear fender. The combination of the engagement of the tongue 34 and the fastener 36 provides a secure assembly upon the rear fender 14 of the motorcycle 8. Also provided on the bottom wall 22 are a multiplicity of depending bumpers 44 of rubber or other resilient material which are mounted on the bottom wall by fasteners 46. As can be seen, the bottom wall is convexly arcuate to generally follow the contour of the rear fender 14 and is also transversely arcuate to follow the transverse contour of the rear fender 14.

To provide the compartment with a streamlined appearance, the side walls 28 taper longitudinally to a reduced elevation at the rear wall 26. The top wall 32 is also configured to provide a recess 48 adjacent to and extending about the opening 31.

The cover 20 is similarly molded with an elongate arcuate configuration to conform to the taper on the container 16 and it has a recess 68 in its lower surface in which is mounted a liner 66. Extending about the liner 66 is a resilient sealing strip 74 which seats in the recess 70 about the opening 31 in the storage container 16.

Figure 5:
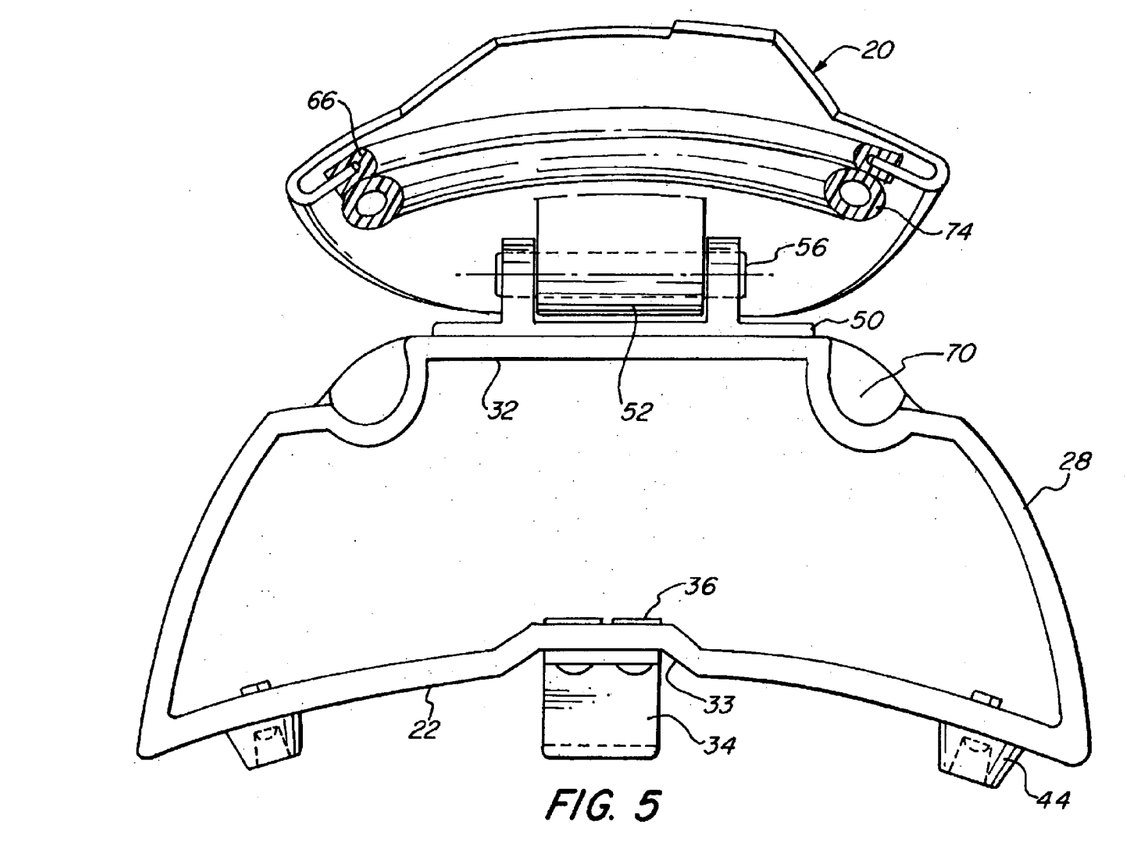
FIG. 5 is a fragmentary cross sectional view showing the hinge area of FIG. 4.

Turning next to FIG. 5, the hinge assembly is provided by a boss 52 molded on the cover 20 and a bracket 50 mounted on the container 16. The bracket has a pair of ears which fit about the boss 52. A tubular member 54 is provided in a passageway (not shown) through the boss 52 and a pivot pin 56 extends through the ears on the hinge bracket 50 and tube 54 to provide the desired pivotal connection. Locating the hinge assembly at the front end of the compartment affords a significant benefit in that air flowing over the cover surface will tend to keep the cover closed in the event that it has not been latched and locked.

Figure 6:
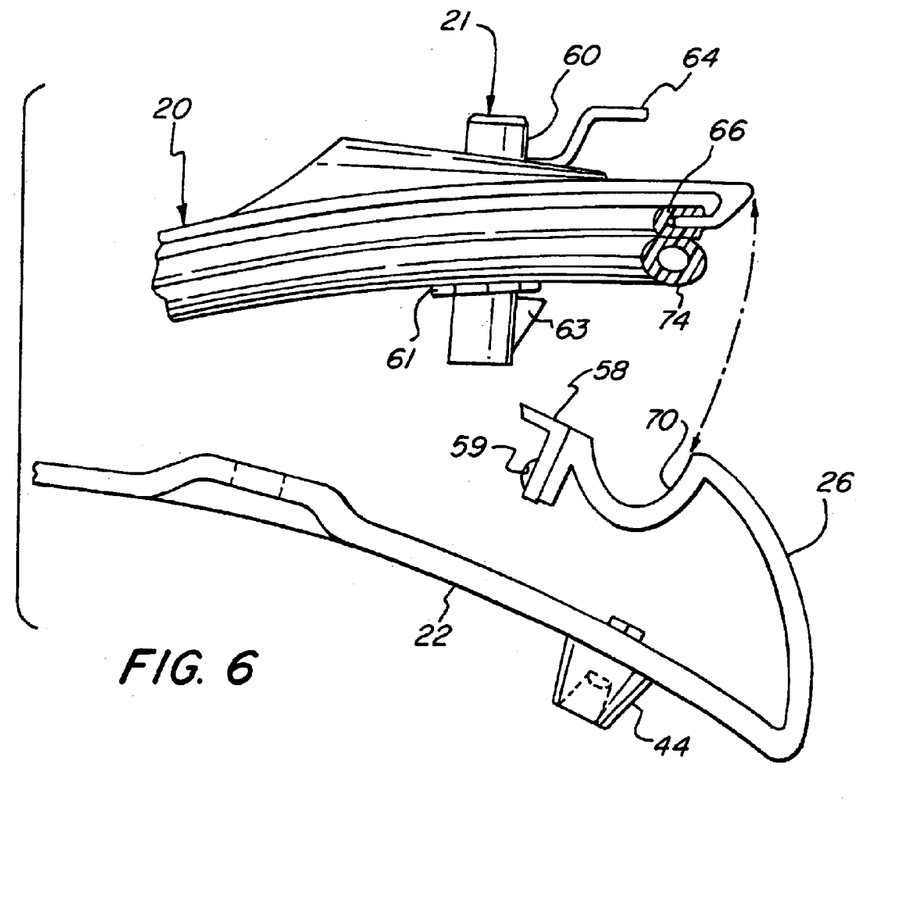
FIG. 6 is a fragmentary sectional view showing the lock area of the compartment and cover.

Turning next to the lock assembly 21, this is seen in FIG. 6 to comprise a strike plate 58 mounted by fasteners 59 on a lip of the container 16 defining the rearward end of the opening 31. Seated in a recess 62 adjacent the rear end of the cover 20 is the lock generally designated by the numeral 60 and its lower end extends through and is secured to the cover 20 by a lock nut 61.

To facilitate opening of the cover after disengagement of the lock 60 from the strike plate 58, a rigid synthetic resin pull strap or tongue 64 is provided on the lock 60. Upon rotation of the lock cylinder, a latch 63 on the depending portion of the lock 60 will engage the strike plate 58.

The storage compartment unit 10 can be quickly mounted upon the motorcycle 10 by inserting the tongue 34 into the recess at the rear of the saddle 12 and then aligning the aperture in the bottom wall 22 with the threaded insert 42 in the rear fender 14. The fastener 40 is then threaded into the insert 42 to firmly engage the compartment upon the rear fender 14.

Figure 7:
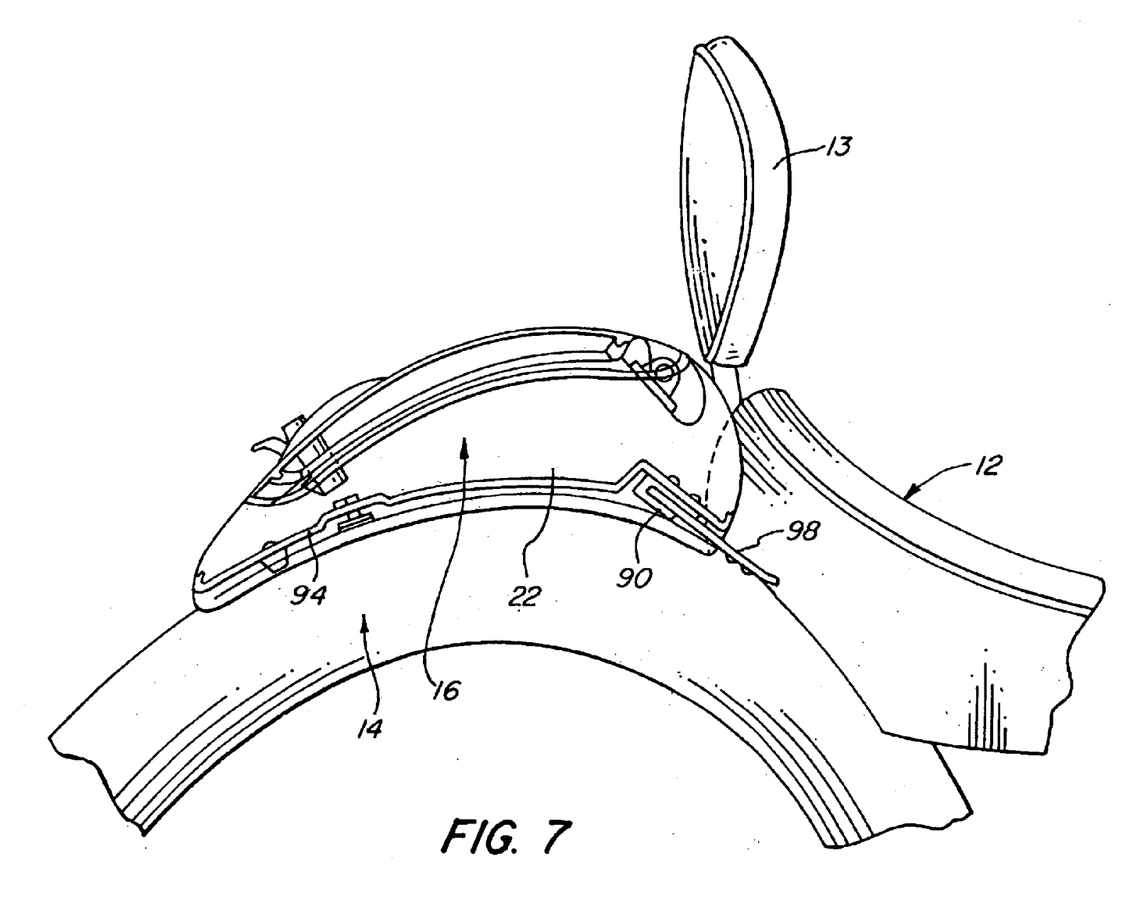
FIG. 7 is a fragmentary sectional view of the compartment with an alternate embodiment for the seat engaging assembly.

Turning now to FIG. 7, therein illustrated is an alternative embodiment in which the saddle generally designated by the numeral 12 has a rearwardly projecting tongue 98 which will engage or seat in the bracket 90 on the bottom wall 94 of the container 16. In the same manner as provided in the embodiment of FIGS. 1–6, the bottom wall 94 is further secured to the rear fender 14 of the motorcycle 10 by a fastener 40 engaging in the threaded insert 42 of the rear fender 14.

Figure 8:
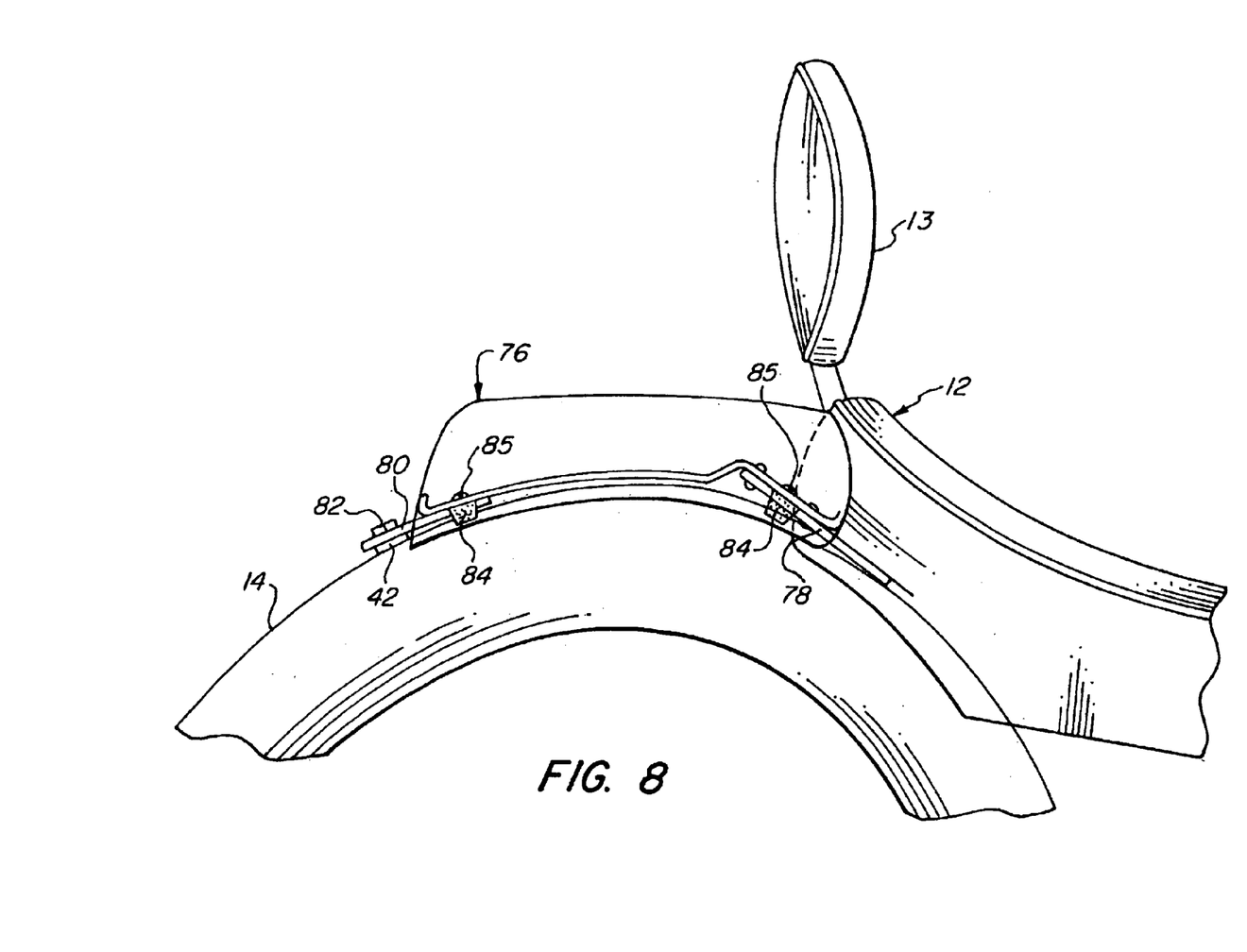
FIG. 8 is a view of the fragmentarily illustrated motorcycle with a rear seat mounted thereon in place of the storage container.

Turning now to FIG. 8, therein illustrated is a rear seat generally designated by the numeral 76 mounted on the rear fender 14 of the motorcycle 8 in a position abutting the rearward end of the saddle 12 and using a similar mounting arrangement. As seen, the rear seat 76 has a tongue 78 which is supported on its bottom surface and extends into the same recess in the rear of the saddle 12. At the rearward end, the seat 76 has a tongue 80 which extends rearwardly of the seat 76 and a threaded fastener 82 extends therethrough and threadably engages in the insert 42 provided in the rear fender 14. Bumpers 84 are provided on its bottom surface and secured thereto by fasteners 85.

Thus, when the motorcycle operator desires to transport a passenger, the storage compartment unit 10 may be readily removed by opening the cover 20, unthreading the fastener 40 and sliding the tongue 34 rearwardly from the saddle 12 to effect its disengagement. The seat 76 can quickly be moved into position and fastened securely by the fastener 82.

As will be readily appreciated, the storage compartment is readily fabricated from synthetic resins. Since the specific configuration will generally vary with the motorcycle upon which it is to be mounted in order to blend its appearance with that of the underlying motorcycle, the preferred technique for the manufacture is to utilize glass fiber reinforced synthetic resins laid up utilizing a relatively low cost form. However, if the volume of a storage compartment having a given configuration is large enough, then injection molding and blow molding techniques can be utilized with suitable molds and synthetic thermoplastic resins of character. Compression molding can also be utilized in the event that the volume is large enough to justify the investment in the necessary tooling.

As will be appreciated, the coloration of the exterior of the storage compartment can be provided by the incorporation of suitable dyes and pigments into the resin from which it is being molded. Alternatively, in accordance with conventional practice, the exterior of the container components can be painted.

To provide a smooth and attractive interior, particularly when the storage compartment is fabricated by laying up glass reinforced resin, molded liners of synthetic resin can be inserted into both the base unit and the cover. This synthetic resin will generally be a thermoplastic material which can be readily molded to provide the inserts. If so desired, the resin may also be produced from resins which will have some resiliency and even resins which are formed to provide a cellular structure. Another lining which is economical and easily applied is synthetic resin sheeting; a particularly useful material is foam carpeting which can be secured by adhesive. The liners reduce sound which might be generated by the items being stored within the compartment striking the walls and provide a degree of protection for items which may be placed inside the storage compartment.

It is also desirable to provide a seal between the cover and the base structure as indicated in the illustrated embodiment in order to preclude or minimize penetration into the compartment of water, dirt, etc.

In the illustrated embodiment, the storage compartment has a forwardly extending tongue which fits into a recess or under a bracket, provided at or in the rear end of the saddle. If so desired, the arrangement can be reversed with the saddle having a rearwardly projecting tongue which engages in a bracket provided on the bottom wall of the container.

Moreover, in the illustrated embodiment, the compartment is fabricated with a depending skirt, i.e., side flanges which extend below the level of the bottom wall to conceal the bumpers and fasteners which extend downwardly through the bottom wall. It is desirable, however to space the compartment unit upwardly from the rear fender by rubber bumpers and the like as is shown in the attached drawings.

Thus, it can be seen from this foregoing detailed description and attached drawings that the storage compartment of the present invention is one which can be readily mounted on and dismounted from, the rear fender. It can be contoured to blend with the contours of the associated motorcycle so as to maintain its streamlined appearance. The compartment can be fabricated readily by various molding techniques from synthetic resins so as to provide long life as well as relatively low cost. Moreover, it can be seen that the storage compartment can be readily interchanged with a rear passenger seat as desired by the owner.

Having thus described the invention, what is claimed is:

1. A readily removable storage unit for mounting on the rear fender of a motorcycle having a saddle comprising:
   (a) a storage compartment member having front, rear, side, and bottom walls defining a cavity therebetween, said bottom wall being elongated and arcuate in its elongated axis to conform to the configuration of the motorcycle fender;
   (b) a cover pivotably mounted on said compartment member adjacent said front wall for movement between a cavity closing position and an open position, said cover being dimensioned and configured to provide a closure for said cavity;
   (c) cooperating releasable locking means on said compartment member and said cover adjacent said rear wall for securing said cover in the cavity closing position;
   (d) releasable fastening means on said bottom wall of said compartment member for engagement with the rear fender of the motorcycle upon which the storage unit is mounted; and
   (e) quickly releasable engagement means on said compartment member adjacent said front wall engageable with cooperating engagement means on the rear end of the saddle of the motorcycle, said storage unit being mounted by engaging said engagement means with the rear end of the saddle and engaging said fastening means with the motorcycle rear fender.

2. The storage unit in accordance with claim 1 wherein said bottom wall is also arcuate in the transverse direction to conform to the configuration of the motorcycle fender.

3. The storage unit in accordance with claim 1 wherein said bottom wall has an aperture therein in which a threaded fastener is seated for engagement in a threaded aperture in the rear fender to provide said releasable fastening means.

4. The storage unit in accordance with claim 1 wherein said cover has a recess in which an element of said locking means is seated.

5. The storage unit in accordance with claim 1 wherein there is included a pull strap adjacent said locking means on said cover to facilitate pivoting of the cover into the open position.

6. The storage unit in accordance with claim 1 wherein said cover is arcuate in the longitudinal direction and said side walls taper from said front wall to a reduced dimension at said rear wall to provide a streamlined appearance.

7. The storage unit in accordance with claim 1 wherein said engagement means comprises a tongue on said bottom wall extending beyond said front wall to engage cooperating engagement means on the saddle.

8. The storage unit in accordance with claim 1 wherein said engagement means comprises a bracket on said bottom wall which is adapted to receive a tongue projecting rearwardly from the saddle.

9. A readily removable storage unit for mounting on the rear fender of a motorcycle having a saddle comprising:
   (a) a storage compartment member having front, rear, side, and bottom walls defining a cavity therebetween, said bottom wall of said storage compartment having resilient bumpers thereon to space said bottom wall from the motorcycle fender;
   (b) a cover pivotably mounted on said compartment member adjacent said front wall for movement between a cavity closing position and an open position, said cover being dimensioned and configured to provide a closure for said cavity;
   (c) cooperating releasable locking means on said compartment member and said cover adjacent said rear wall for securing said cover in the cavity closing position;
   (d) releasable fastening means on said bottom wall of said compartment member for engagement with the rear fender of the motorcycle upon which the storage unit is mounted; and
   (e) quickly releasable engagement means on said compartment member adjacent said front wall engageable with cooperating engagement means on the rear end of the saddle of the motorcycle, said storage unit being mounted by engaging said engagement means with the rear end of the saddle and engaging said fastening means with the motorcycle rear fender.

10. A readily removable storage unit for mounting on the rear fender of a motorcycle having a saddle comprising:
    (a) a storage compartment member having front, rear, side, and bottom walls defining a cavity therebetween;
    (b) a cover pivotably mounted on said compartment member adjacent said front wall for movement between a cavity closing position and an open position, said cover being dimensioned and configured to provide a closure for said cavity, said cover having sealing means extending about its periphery and said compartment member has a cooperating recess into which said scaling means extends;
    (c) cooperating releasable locking means on said compartment member and said cover adjacent said rear wall for securing said cover in the cavity closing position;
    (d) releasable fastening means on said bottom wall of said compartment member for engagement with the rear fender of the motorcycle upon which the storage unit is mounted; and
    (e) quickly releasable engagement means on said compartment member adjacent said front wall engageable with cooperating engagement teens on the rear end of the saddle of the motorcycle, said storage unit being mounted by engaging said engagement means with the rear end of the saddle and engaging said fastening means with the motorcycle rear fender.

11. A readily removable storage unit for mounting on the rear fender of a motorcycle having a saddle comprising:
    (a) a storage compartment member having front, rear, side, and bottom walls defining a cavity therebetween; said bottom wall of said storage compartment member being elongated and arcuate in its elongated axis to conform to the configuration of the motorcycle fender;
    (b) a cover pivotably mounted on said compartment member adjacent said front wall for movement between a cavity closing position and an open position, said cover being dimensioned and configured to provide a closure for said cavity, said cover being arcuate in the longitudinal direction and said side walls of said compartment member tapering from said front wall to a reduced dimension at said rear wall to provide a streamlined appearance;

(c) cooperating releasable locking means on said compartment member and said cover adjacent said rear wall for securing said cover in the cavity closing position;

(d) releasable fastening means on said bottom wall of said compartment member for engagement with the rear fender of the motorcycle upon which the storage unit is mounted, said bottom wall having an aperture therein in which a threaded fastener is seated for releasable engagement in a threaded aperture in the rear fender; and (e) quickly releasable engagement means on said compartment member adjacent said front wall engageable with cooperating engagement means on the rear end of the saddle of the motorcycle, said storage unit being mounted by engaging said engagement means with the rear end of the saddle and engaging said fastening means with the motorcycle rear fender.

12. The storage unit in accordance with claim 11 wherein said engagement means comprises a tongue on said bottom wall and extending beyond said front wall to engage the saddle.

13. The storage unit in accordance with claim 11 wherein said engagement mean comprises a bracket on said bottom wall which is adapted to receive a tongue projecting rearwardly from the saddle.

14. The storage unit in accordance with claim 11 wherein said cover has sealing means extending about its periphery and said compartment member being a cooperating recess into which said sealing means extends, and wherein there is included a pull strap adjacent said locking means on said cover to facilitate pivoting of the cover into the open position.

15. The storage unit in accordance with claim 11 wherein said bottom wall of said storage compartment member has resilient bumpers thereon to space said bottom wall from the motorcycle fender.

* * * * *

UNITED STATES PATENT AND TRADEMARK OFFICE
CERTIFICATE OF CORRECTION

PATENT NO. : 6,729,516 B2
DATED : May 4, 2004
INVENTOR(S) : Michael W. Hanagan

It is certified that error appears in the above-identified patent and that said Letters Patent is hereby corrected as shown below:

Column 6,
Line 48, "teens" should be "means".

Signed and Sealed this

Sixth Day of July, 2004

JON W. DUDAS
*Acting Director of the United States Patent and Trademark Office*